US012586726B2

(12) United States Patent
Tomizawa et al.

(10) Patent No.: US 12,586,726 B2
(45) Date of Patent: Mar. 24, 2026

(54) MULTILAYER CERAMIC ELECTRONIC COMPONENT AND MANUFACTURING METHOD THEREOF

(71) Applicant: Taiyo Yuden Co., Ltd., Tokyo (JP)

(72) Inventors: Yuji Tomizawa, Tokyo (JP); Yasuhito Hagiwara, Tokyo (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 91 days.

(21) Appl. No.: 18/422,495

(22) Filed: Jan. 25, 2024

(65) Prior Publication Data

US 2024/0258035 A1 Aug. 1, 2024

(30) Foreign Application Priority Data

Jan. 31, 2023 (JP) .................................. 2023-012735

(51) Int. Cl.
| | |
|---|---|
| *H01G 4/232* | (2006.01) |
| *H01G 4/12* | (2006.01) |
| *H01G 4/224* | (2006.01) |
| *H01G 4/248* | (2006.01) |
| *H01G 4/30* | (2006.01) |

(52) U.S. Cl.
CPC ........... *H01G 4/2325* (2013.01); *H01G 4/224* (2013.01); *H01G 4/232* (2013.01); *H01G 4/248* (2013.01); *H01G 4/306* (2013.01); *H01G 4/12* (2013.01)

(58) Field of Classification Search
CPC ...... H01G 4/2325; H01G 4/224; H01G 4/248; H01G 4/306; H01G 4/12; H01G 4/232; H01G 4/30
See application file for complete search history.

(56) References Cited

U.S. PATENT DOCUMENTS

| | | | | |
|---|---|---|---|---|
| 2010/0157507 | A1* | 6/2010 | Matsumoto .............. | H01G 4/30 361/306.3 |
| 2018/0025844 | A1* | 1/2018 | Sato ...................... | H01G 4/008 361/321.2 |
| 2020/0328029 | A1* | 10/2020 | Sugiyama .............. | H01G 4/012 |

(Continued)

FOREIGN PATENT DOCUMENTS

| | | | |
|---|---|---|---|
| JP | H08-162357 | | 6/1996 |
| JP | H1097942 A | * | 4/1998 |

(Continued)

*Primary Examiner* — Timothy J. Dole
*Assistant Examiner* — Daniel M Dubuisson
(74) *Attorney, Agent, or Firm* — CHIP LAW GROUP

(57) ABSTRACT

Provided is a multilayer ceramic electronic component including a ceramic element having a multilayer body in which internal electrodes are stacked with interposition of a dielectric layer and the internal electrodes are led out in a direction orthogonal to a stacking direction, and a protective part located at least on upper and lower surfaces of the multilayer body in the stacking direction, an underlying electrode layer formed at least on part of a surface of the protective part on either one or both of upper and lower sides in the stacking direction, a covering layer that covers an end part or a rim part of the underlying electrode layer, a plating layer that covers at least an upper surface of the underlying electrode layer, and at least a pair of external electrodes having the underlying electrode layer and the plating layer and being electrically connected to the internal electrodes.

11 Claims, 6 Drawing Sheets

(56)  References Cited

U.S. PATENT DOCUMENTS

| | | | | |
|---|---|---|---|---|
| 2021/0272756 A1* | 9/2021 | Chikuma | ............. | H01G 4/1209 |
| 2022/0093337 A1* | 3/2022 | Han | ....................... | H01G 4/224 |
| 2023/0162922 A1* | 5/2023 | Kokawa | ................ | H01G 4/012 |
| | | | | 361/301.4 |
| 2023/0207220 A1* | 6/2023 | Kim | ....................... | H01G 2/065 |
| | | | | 361/306.3 |
| 2024/0096524 A1* | 3/2024 | Tokieda | ................ | H01C 7/041 |

FOREIGN PATENT DOCUMENTS

| | | |
|---|---|---|
| JP | 2001-44069 | 2/2001 |
| JP | 2018-18845 | 2/2018 |
| JP | 2019-212746 | 12/2019 |
| JP | 2021-93494 | 6/2021 |
| JP | 2021-114584 | 8/2021 |

* cited by examiner

F I G . 4
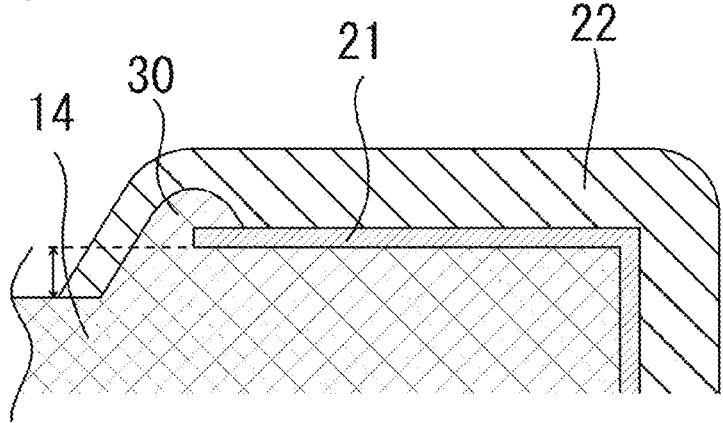
F I G . 5
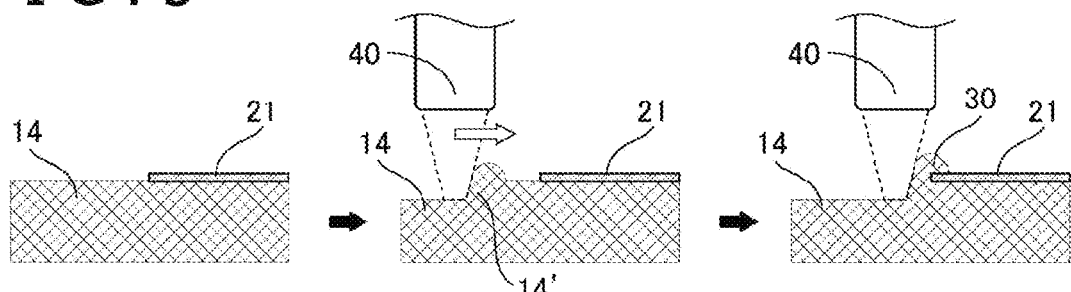
F I G . 6
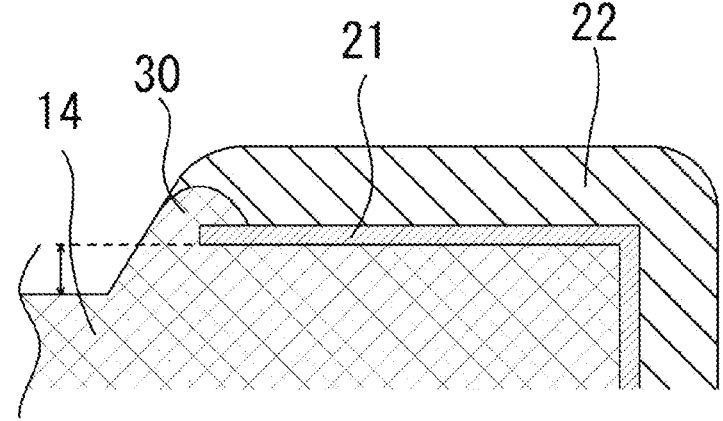

F I G . 7
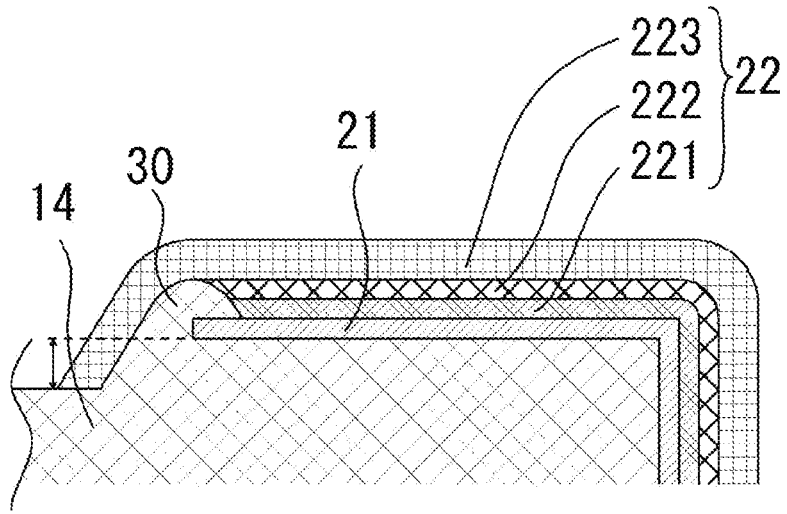
F I G . 8
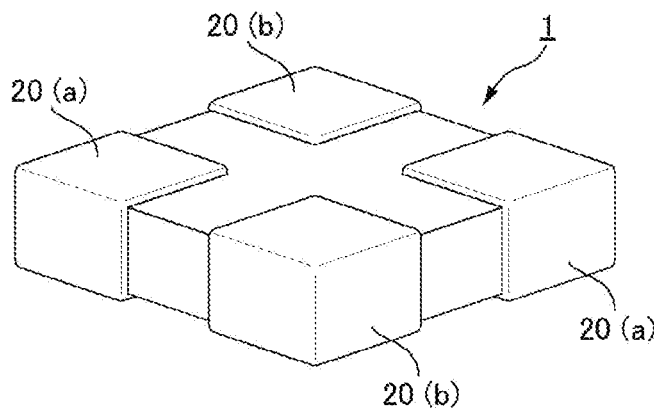

F I G . 9
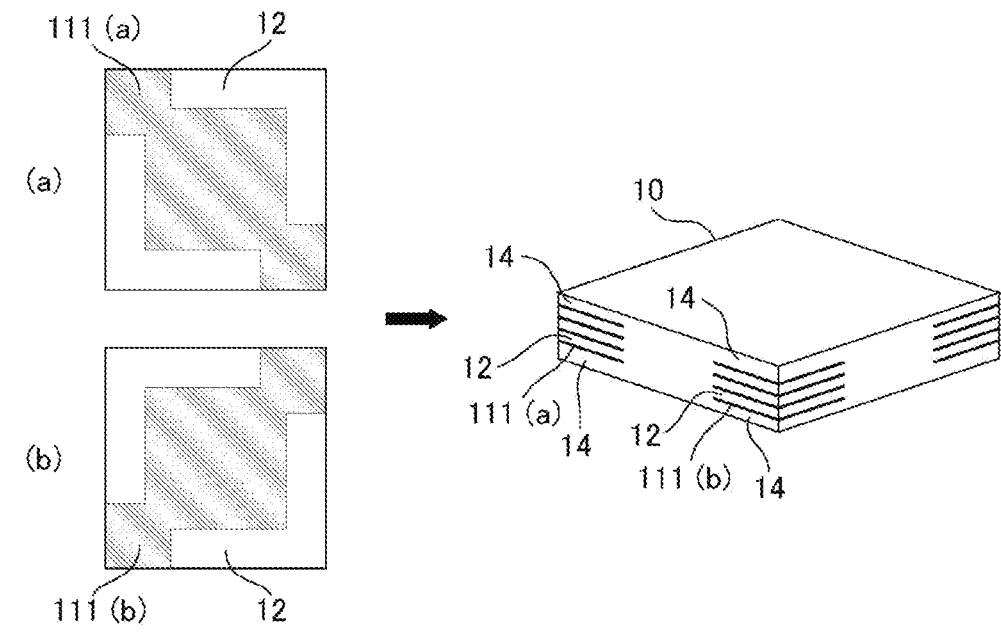
F I G . 1 0
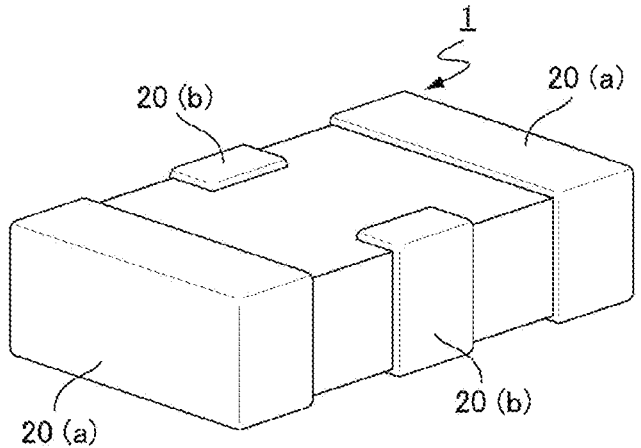

F I G . 1 1
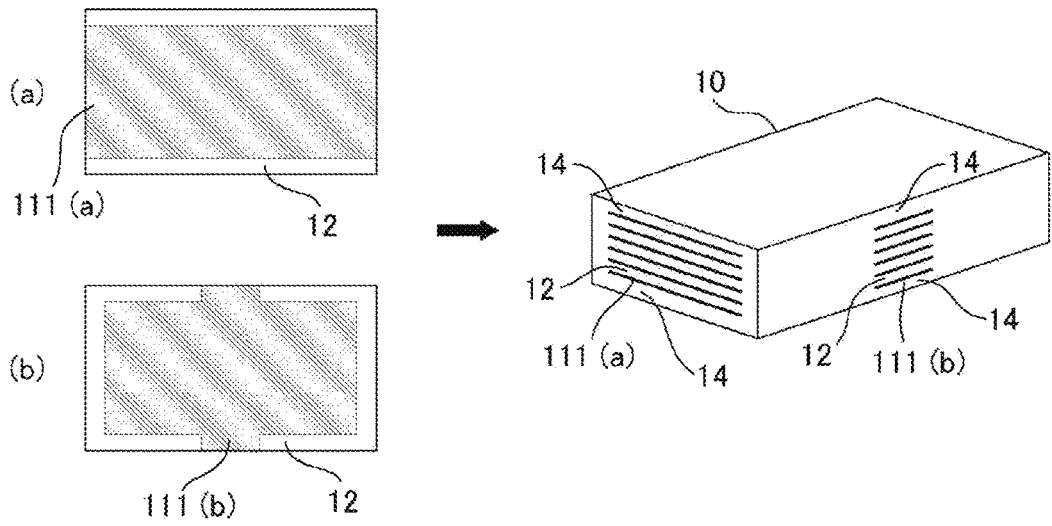
F I G . 1 2
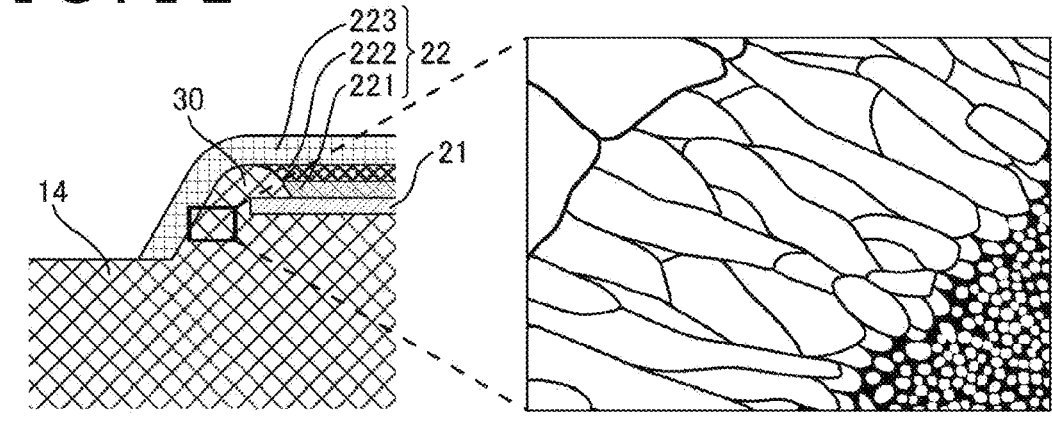
F I G . 1 3
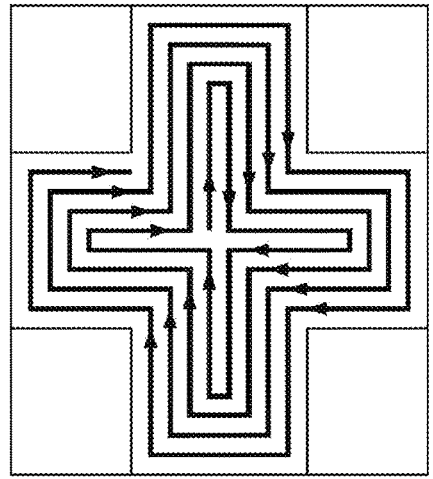

FIG.14

MULTILAYER CERAMIC ELECTRONIC COMPONENT AND MANUFACTURING METHOD THEREOF

CROSS REFERENCE TO RELATED APPLICATIONS

This application claims priority benefit of Japanese Patent Application No. JP 2023-012735 filed in the Japan Patent Office on Jan. 31, 2023. Each of the above-referenced applications is hereby incorporated herein by reference in its entirety.

BACKGROUND

The present disclosure relates to a multilayer ceramic electronic component and a manufacturing method thereof and particularly to a multilayer ceramic electronic component having external electrodes on the upper and lower surfaces of a ceramic element.

In recent years, in association with reduction in the size and reduction in the thickness of layers in pieces of digital electronic equipment such as mobile phones, reduction in the size and increase in the capacity have been advanced in multilayer ceramic capacitors which are surface-mounted on an electronic circuit board or other boards.

In particular, as a decoupling capacitor disposed around a central processing unit (CPU) in a smartphone, an ultra-small-size, low-height one with a reduced thickness is used. This is because there has been an increasing tendency that the multilayer ceramic capacitor is disposed directly under a die of an integrated circuit (IC) chip for the purpose of reducing the mounting area and for the purpose of reducing the equivalent series inductance (ESL).

A multilayer ceramic electronic component includes a ceramic element in which multiple internal electrodes are stacked with the interposition of a dielectric layer composed mainly of a ceramic and external electrodes.

In general, when the size of the multilayer ceramic electronic component is made smaller, the area of the internal electrodes stacked with the interposition of the ceramic layers becomes smaller, and therefore the capacitance decreases.

Thus, to ensure the capacitance while reducing the size of the multilayer ceramic electronic component, making the ceramic layers and layers of the internal electrodes thinner and increasing the number of stacked layers are effective. Such reduction in the thickness of the ceramic layers and the internal electrodes is effective also for reduction in the height of the multilayer ceramic electronic component.

Further, also regarding the external electrodes disposed on the upper and lower surfaces of the ceramic element, reduction in the thickness of a layer for the purpose of reduction in the height of the multilayer ceramic electronic component is being studied.

FIG. 1 is a perspective view illustrating representative one example of a multilayer ceramic capacitor that is one of multilayer ceramic electronic components. FIG. 2 is a schematic sectional view obtained by cutting by a plane parallel to a side surface regarding the multilayer ceramic capacitor.

As illustrated in FIG. 1 and FIG. 2, the representative multilayer ceramic capacitor has a ceramic element 10 and a pair of external electrodes 20a and 20b that are disposed on both end surfaces of the ceramic element 10 and that have different polarities. In general, the external electrodes 20a and 20b each have an underlying electrode layer and a plating layer formed thereon, and a part of each of the external electrodes wraps around the upper and lower surfaces and both side surfaces of the ceramic element. Hereinafter, a part A which the external electrode wraps around will be referred to as a "wraparound part."

The above-described multilayer ceramic capacitor 1 cited as one example of the multilayer ceramic electronic component having the wraparound parts on the upper and lower surfaces of the ceramic element is a two-terminal-type multilayer ceramic capacitor having the pair of external electrodes 20. However, there are also what have a larger number of external electrodes than two.

For example, a four-terminal-type multilayer ceramic capacitor having four external electrodes is disclosed in Japanese Patent Laid-open No. 2021-114584 (Patent Document 1). A three-terminal-type multilayer ceramic capacitor having three external electrodes is disclosed in Japanese Patent Laid-open No. 2019-212746 (Patent Document 2).

Furthermore, there are also multilayer ceramic electronic components having multiple external electrodes only on the upper and lower surfaces of a ceramic element.

As one example thereof, a multilayer ceramic capacitor having a ceramic element including a multilayer body in which multiple internal electrodes are stacked with the interposition of a dielectric layer and four external electrodes on each of the upper and lower surfaces of the ceramic element is disclosed in Japanese Patent Laid-open No. 2021-93494 (hereinafter, Patent Document 3). In the multilayer ceramic capacitor, four through-holes are formed inside the ceramic element, and the above-described four external electrodes are electrically connected to the above-described internal electrodes through an electrically-conductive material with which the respective through-holes are filled.

In such a multilayer ceramic electronic component having the external electrodes on the upper and lower surfaces of the ceramic element, by decreasing the thickness of the external electrodes disposed on the upper and lower surfaces of the ceramic element, the number of stacked layers can be increased or the margin necessary for insulation or other operations can be made thicker corresponding to the amount of decrease in the thickness of the external electrodes. In particular, by forming underlying electrode layers in the external electrodes by a sputtering method, the underlying electrode layers can be made thinner and more even than existing metal layers formed through sintering electrically-conductive paste. Thus, forming the underlying electrode layers by the sputtering method is effective for reduction in the height and reduction in the size of the multilayer ceramic electronic component.

However, when the thickness of the external electrodes on the upper and lower surfaces of the ceramic element is reduced for reduction in the height, the adhesive strength between the external electrode and the ceramic element may lower, and the external electrode may be separated from the ceramic element, in some cases. In particular, when the multilayer ceramic electronic component has the underlying electrode layers deposited by the sputtering method, there is a problem that the underlying electrode layer readily rolls up from an end part thereof.

As a countermeasure to prevent separation of the external electrode, adding a covering layer to the surface of the ceramic element of the multilayer ceramic electronic component is already well known.

For example, in multilayer ceramic electronic components disclosed in Japanese Patent Laid-open No. H08-162357 and Japanese Patent Laid-open No. 2001-44069 (hereinafter, Patent Document 4 and Patent Document 5, respectively), a resin layer of an epoxy resin or other materials or a glass coat layer is formed on the upper and lower surfaces and both side surfaces of a ceramic element and tip parts of external electrodes in wraparound parts are covered by the resin layer or the glass coat layer.

Moreover, in Patent Document 4, it is disclosed that entry of a plating solution, water, and so forth from the joint part between the external electrode and the ceramic element becomes less likely to occur due to the existence of the glass coat layer.

Further, Japanese Patent Laid-open No. 2018-18845 (hereinafter, Patent Document 6) includes the following description. In a multilayer ceramic capacitor having wraparound parts of external electrodes, a covering part that covers a tip part of an underlying electrode layer of the wraparound part and is composed of a ceramic sintered body (sintered body of barium titanate) is made. Due to this, even when the thickness of the wraparound parts of the external electrodes is made small, the fear that the wraparound part is separated from the capacitor main body can be decreased.

SUMMARY

In the methods disclosed in Patent Documents 4 and 5, besides the materials used to manufacture the main body of the multilayer ceramic electronic component, a resin or oxide glass for forming the glass coat layer needs to be separately used.

In contrast, in the method disclosed in Patent Document 6, the covering layer can be manufactured by using the same material as the ceramic material (barium titanate) that configures the main body of the multilayer ceramic capacitor.

However, the method disclosed in Patent Document 6 is a method in which an unfired sheet having unfired underlying electrode layers composed of electrode paste printed on a ceramic green sheet and a ceramic slurry layer printed to cover part of the unfired underlying electrode layers is fired after being stacked on an unfired multilayer chip, that is, a method in which the underlying electrode layers and the ceramic covering layer are simultaneously formed at the time of the firing of the unfired multilayer chip. Therefore, there is a restriction that it is impossible to use a metal such as Cu, which is molten at a firing temperature of the ceramic, as the electrically-conductive material that configures the underlying electrode layers.

The present disclosure is made in view of the above-described circumstances in such pieces of related art and intends to provide a multilayer ceramic electronic component and a manufacturing method thereof that can prevent separation of external electrodes formed on part of one or both of the upper and lower surfaces of a ceramic element by using a covering layer that does not have a restriction on an electrically-conductive material used and can be obtained by a simple method without increasing kinds of materials to be used. Further, another desire of the present disclosure is to provide a multilayer ceramic electronic component and a manufacturing method thereof that allow further reduction in the height by making external electrodes thinner without impairing the reliability.

The present inventors have obtained the following knowledge as the result of making studies about the above-described circumstances. By irradiating the vicinity of an underlying electrode layer with a laser for a ceramic element having upper and lower surfaces on which the underlying electrode layers are formed to melt a ceramic layer at the surface by a predetermined depth, the molten ceramic layer moves toward the underlying electrode layer side and solidifies, and an end part or a rim part of the underlying electrode layer can be covered. Further, the present inventors have found that, even when the underlying electrode layers are made thin, the underlying electrode layers can be prevented from rolling up due to the covering of the end parts or the rim parts of the underlying electrode layers by the ceramic layer that has been molten and solidified and plating layers formed on the underlying electrode layers become less likely to be separated, so that the present inventors have reached completion of the present disclosure.

That is, one example of the present disclosure is a multilayer ceramic electronic component including a ceramic element having a multilayer body in which a plurality of internal electrodes are stacked with interposition of a dielectric layer and the internal electrodes are led out in a direction orthogonal to a stacking direction, and a protective part that is located at least on upper and lower surfaces of the multilayer body in the stacking direction and is formed of a ceramic layer, an underlying electrode layer formed at least on part of a surface of the protective part on either one or both of upper and lower sides in the stacking direction, a covering layer that is continuous with the ceramic layer of the protective part near the underlying electrode layer and covers an end part or a rim part of the underlying electrode layer, a plating layer that covers at least an upper surface of the underlying electrode layer, and at least a pair of external electrodes that have the underlying electrode layer and the plating layer and are electrically connected to the internal electrodes, in which, at least in a boundary region with the covering layer in the protective part on which the external electrode is not formed, a position of the surface of the protective part on which the external electrode is not formed in the stacking direction is located on a side of the multilayer body relative to a position of a boundary line between the underlying electrode layer and the protective part in the stacking direction.

Another example of the present disclosure is a manufacturing method of a multilayer ceramic electronic component, the manufacturing method including (1) forming a multilayer sheet through executing stacking and pressure bonding of ceramic green sheets that do not have an internal electrode pattern after stacking ceramic green sheets on which a predetermined number of internal electrode patterns are printed, (2) cutting the multilayer sheet to form a multilayer chip, (3) firing the multilayer chip to form a ceramic element, (4) forming an underlying electrode layer at least on part of a surface of a protective part on either one or both of upper and lower sides in a stacking direction in the ceramic element, (5) forming a covering layer by irradiating a vicinity of the underlying electrode layer in the protective part with a laser and melting and removing the surface of the protective part by a predetermined depth to cover an end part or a rim part of the underlying electrode layer by a molten ceramic layer, and (6) forming a plating layer that covers at least the underlying electrode layer.

According to the present disclosure, the end part or the rim part of the underlying electrode layer formed at least on part of either one or both of the upper and lower surfaces of the protective part in the stacking direction becomes less likely to be separated. Due to this, the plating layer on the underlying electrode layer also becomes less likely to be separated and, a high adhesion strength is kept. Further, the plating layer extends also on the covering layer formed of the molten solidified layer of the ceramic that covers the underlying electrode layer. Therefore, the adhesion of the external electrode to the ceramic element improves, and the multilayer ceramic electronic component with improved reliability is obtained.

BRIEF DESCRIPTION OF THE DRAWINGS

FIG. 4 is a partially sectional view that schematically illustrates one example of an external electrode that is formed on part of the upper surface of a protective part of the ceramic element and has an underlying electrode layer, a covering layer, and a plating layer in the multilayer ceramic capacitor according to the present embodiment and is obtained by cutting by a plane parallel to the side surface;

FIG. 5 is a diagram that explains that the covering layer is formed to cover one end part of the underlying electrode layer by irradiation with a laser;

FIG. 6 is a partially sectional view that schematically illustrates another example of the external electrode that is formed on part of the surface of the protective part of the ceramic element and has the underlying electrode layer, the covering layer, and the plating layer in the multilayer ceramic capacitor according to the present embodiment and is obtained by cutting by a plane parallel to the side surface;

FIG. 7 is a partially sectional view that illustrates one example in which the plating layer illustrated in FIG. 4 is formed from multiple layers and is obtained by cutting by a plane parallel to the side surface;

FIG. 8 is a perspective view schematically illustrating one example of a four-terminal-type multilayer ceramic capacitor;

FIG. 9 is a schematic diagram that exemplifies the multilayer structure of internal electrodes inside the ceramic element in the multilayer ceramic capacitor illustrated in FIG. 8;

FIG. 10 is a perspective view schematically illustrating one example of a three-terminal-type multilayer ceramic capacitor;

FIG. 11 is a schematic diagram that exemplifies the multilayer structure of the internal electrodes inside the ceramic element in the multilayer ceramic capacitor illustrated in FIG. 10;

FIG. 12 is a diagram schematically illustrating an electron back scattered diffraction (EBSD) image of the covering layer obtained in working example 1;

FIG. 13 is a diagram schematically illustrating a laser scanning method in working example 2; and FIG. 14 is a sectional view schematically illustrating a swollen region at a central part of the protective part surface, formed by melting processing by a laser, in working example 3.

DETAILED DESCRIPTION OF THE PREFERRED EMBODIMENT

An embodiment for carrying out the present disclosure will be described below. However, the present disclosure is not limited by the present embodiment, and other various embodiments are included therein as long as being within the range of technical ideas set forth in the scope of claims.

That is, the present disclosure can be applied to overall multilayer ceramic electronic components having a ceramic element in which dielectric layers composed mainly of a ceramic are stacked with the interposition of conductor layers that are internal electrodes. Besides a multilayer ceramic capacitor to be described below as the present embodiment, a piezoelectric element, a thermistor, and so forth are cited, for example.

When a numerical value range or other ranges is represented by using "to," this means that the numerical value range or the other ranges includes also numerical values described as the lower limit and the upper limit thereof. Further, when a direction or like representations is represented by using a term "orthogonal," "horizontal," or "parallel," this means that the direction or the like representations is not limited to the meaning of the description and includes a range in the vicinity thereof.

[Multilayer Ceramic Capacitor]

The multilayer ceramic capacitor that is one example of the present embodiment (hereinafter, referred to as a "multilayer ceramic capacitor according to the present embodiment") includes a ceramic element and external electrodes similar to those of existing multilayer ceramic capacitors.

The dimensions of the multilayer ceramic capacitor according to the present embodiment are not limited. In the case of the multilayer ceramic capacitor with a low height, the length (L) is 1.0 mm, the width (W) is 0.5 mm, and the thickness (T) is at most 110 μm.

The ceramic element and the external electrodes in the multilayer ceramic capacitor according to the present embodiment will be described below.

<Ceramic Element>

Figure 1:
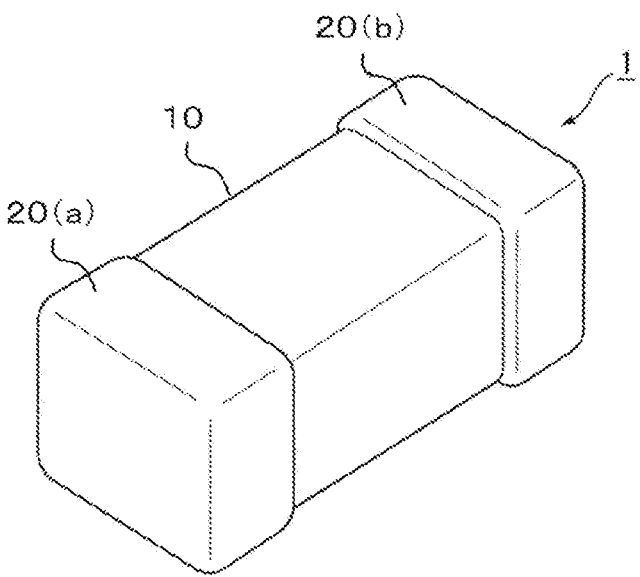
FIG. 1 is a perspective view of a representative multilayer ceramic capacitor.
Figure 2:
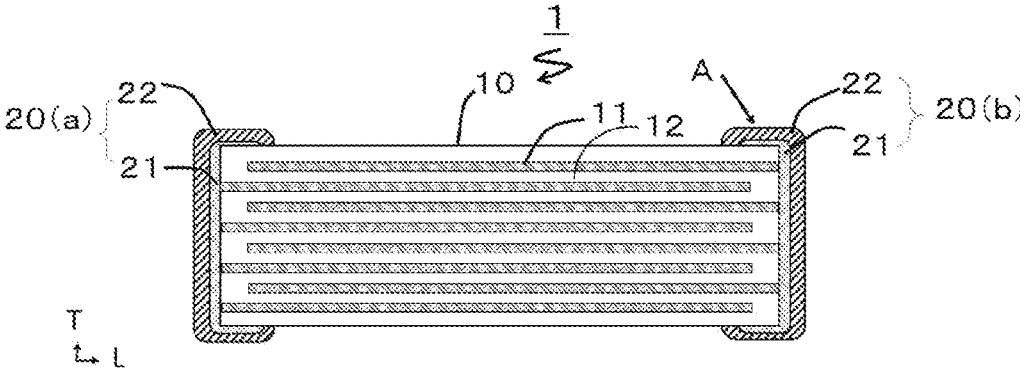
FIG. 2 is a schematic sectional view obtained by cutting by a plane parallel to a side surface regarding the multilayer ceramic capacitor of FIG. 1.
Figure 3:
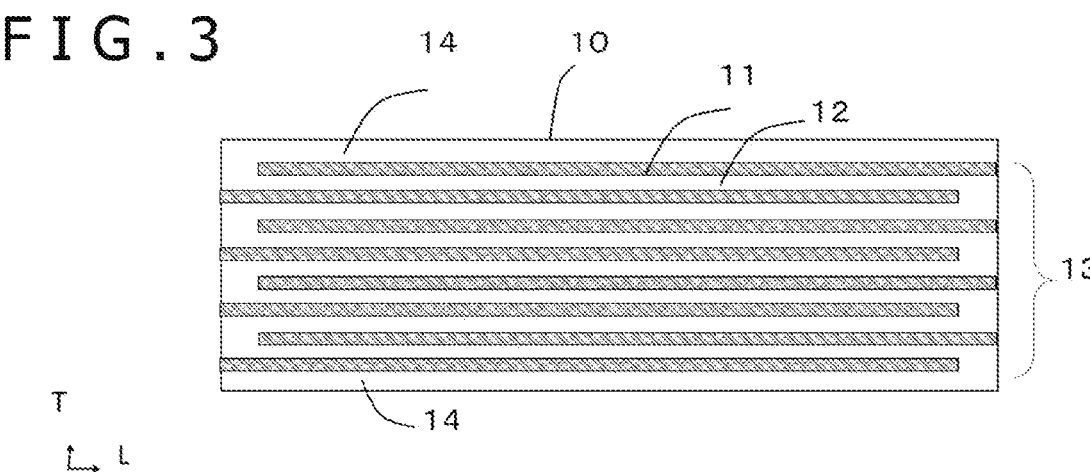
FIG. 3 is a sectional view that schematically illustrates a ceramic element in a multilayer ceramic capacitor according to the present embodiment and is obtained by cutting by a plane parallel to a side surface.

FIG. 3 is a sectional view that schematically illustrates a ceramic element 10 in the multilayer ceramic capacitor according to the present embodiment and is obtained by cutting by a plane parallel to a side surface.

As illustrated in FIG. 3, the ceramic element 10 in the multilayer ceramic capacitor according to the present embodiment includes a multilayer body 13 in which plural internal electrodes 11 are stacked with the interposition of a dielectric layer 12 and the internal electrodes are led out to both end surfaces in the direction orthogonal to the stacking direction, protective parts 14 located on the upper and lower surfaces of the multilayer body 13 in the stacking direction, and the protective parts 14 (not illustrated) located on a pair of side surfaces orthogonal to both of the upper and lower surfaces and the end surfaces.

In FIG. 3, illustration is not made about details of the position of the surface of the protective part 14 in the stacking direction. Description thereof will be made in the next section <External Electrode>.

[Internal Electrode]

In the multilayer ceramic capacitor according to the present embodiment, an electrically-conductive material that forms the internal electrodes 11 is not particularly limited. For example, at least one kind of metal material selected from a group consisting of nickel (Ni), copper (Cu), palladium (Pd), platinum (Pt), silver (Ag), and gold (Au) is used as the electrically-conductive material. It is preferable to employ a base metal material such as Ni or Cu as a main component in that the manufacturing cost can be suppressed. In particular, Ni is more preferable in that simultaneous firing with the dielectric layer 12 can be intended. When Ni is employed as a main component as a metal material, tin (Sn) or gold (Au) may be added.

When the multilayer ceramic capacitor according to the present embodiment is a multilayer ceramic capacitor with a low height, normally the thickness of the internal electrodes is 0.5 to 3.0 μm.

[Dielectric Layer]

In the multilayer ceramic capacitor according to the present embodiment, the dielectric layer 12 is obtained by firing ceramic raw material powder.

As the dielectric ceramic, a dielectric ceramic with a high dielectric constant is used in order to make the capacitance of the dielectric layer high. As the dielectric ceramic with a high dielectric constant, a material that contains barium (Ba) and titanium (Ti) and has the perovskite structure, typified by barium titanate (BaTiO₃), is cited, for example.

In the dielectric ceramic, strontium titanate (SrTiO₃), calcium titanate (CaTiO₃), magnesium titanate (MgTiO₃), calcium zirconate (CaZrO₃), calcium titanate zirconate (Ca(Ti, Zr)O₃), barium calcium titanate zirconate ((Ba, Ca) (Ti, Zr)O₃), barium zirconate (BaZrO₃), titanium oxide (TiO₂), or other elements may be contained.

Moreover, in the dielectric ceramic, a glass phase or other elements other than the dielectric ceramic may be contained.

When the multilayer ceramic capacitor according to the present embodiment is a multilayer ceramic capacitor with a low height, it is preferable that the thickness of the dielectric layer 12 be equal to or smaller than 5 μm as the thickness after the firing, and it is more preferable that the thickness be equal to or smaller than 3 μm, and it is further preferable that the thickness be equal to or smaller than 1 μm. By making the thickness of the dielectric layer 12 smaller, the number of stacked layers of the dielectric layer 12 can be increased. As a result, the capacitance of the multilayer ceramic capacitor can be increased without making the dimensions of the multilayer body larger.

[Protective Part]

The protective parts 14 are disposed in order to protect the internal electrodes and the dielectric layer from moisture, contamination, and so forth from the external and prevent the deterioration of them over time.

The material of the protective parts is not particularly limited. In terms of adhesiveness with the multilayer body and electrical insulation, it is preferable that the material of the protective parts be a ceramic material, and it is more preferable that the material be the same as the main component of the ceramic that configures the above-described dielectric layer.

When the multilayer ceramic capacitor according to the present embodiment is a multilayer ceramic capacitor with a low height, normally the thickness of the protective parts is 5 to 20 μm as the thickness after the firing.

<External Electrode>

In the multilayer ceramic capacitor according to the present embodiment, the pair of external electrodes with different polarities are formed on both end surfaces of the above-described multilayer body 13, and part thereof is formed to wrap around the upper and lower surfaces and both side surfaces of the above-described protective parts 14.

FIG. 4 is a partially sectional view that schematically illustrates the external electrode 20 formed to wrap around the surface of the protective part 14 of the above-described multilayer body 13 and is obtained by cutting by a plane parallel to the side surface. In the diagram, numeral 14 denotes the protective part and numeral 21 denotes an underlying electrode layer. Numeral 22 denotes a plating layer and numeral 30 denotes a covering layer.

As illustrated in FIG. 4, in the multilayer ceramic capacitor according to the present embodiment, the external electrodes have the underlying electrode layer 21 and the plating layer 22 formed thereon, and an end part of the underlying electrode layer 21 at the wraparound part formed at least on either one of the upper and lower surfaces of the above-described protective part 14 in the stacking direction is covered by the covering layer 30.

FIG. 5 is a diagram that explains that the covering layer 30 is formed to cover an end part of the underlying electrode layer 21 by irradiation with a laser, and illustrates that the ceramic element on which the underlying electrode layer 21 is formed on part of the surface of the protective part 14 is irradiated with the laser from a laser irradiation apparatus 40. In the diagram, numeral 14' denotes the protective part molten due to the laser irradiation.

As illustrated in this diagram, scanning of the surface of the protective part 14 with the laser is executed toward the underlying electrode layer 21 and the surface of the protective part 14 is molten and removed by a predetermined depth. Due to this, at a boundary part between the ceramic element and the underlying electrode layer 21, a ceramic layer of the protective part 14' that has been molten and swollen moves to the side of the underlying electrode layer 21 and solidifies to cover an end part of the underlying electrode layer 21.

The end part of the underlying electrode layer 21 is covered by the covering layer 30 and is present under the covering layer 30. Therefore, the end part is less liable to roll up.

Further, because the end part of the underlying electrode layer 21 is covered by the covering layer 30 and is present under the covering layer 30, the sealing property is enhanced, and entry of a plating solution, water, and so forth from the joint part between the underlying electrode layer and the ceramic element becomes less likely to occur.

In the multilayer ceramic capacitor according to the present embodiment, the plating layer 22 is formed to cover the whole surface of the above-described covering layer 30 in the example illustrated in FIG. 4. However, the plating layer 22 does not need to be formed to cover the whole surface of the covering layer 30, and it suffices for the plating layer 22 to cover at least the upper surface of the above-described underlying electrode layer.

FIG. 6 is a partially sectional view that schematically illustrates another example of the external electrode that is formed on part of the surface of the protective part of the ceramic element and has the underlying electrode layer, the covering layer, and the plating layer in the multilayer ceramic capacitor according to the present embodiment and is obtained by cutting by a plane parallel to the side surface.

In the example illustrated in this diagram, the plating layer 22 is formed to cover a region from an upper part of the covering layer 30 in the height direction to the upper surface of the underlying electrode layer 21.

As illustrated in FIG. 4 or FIG. 6, when the plating layer 22 is formed to cover at least part of the covering layer 30 and extend onto the underlying electrode layer in the multilayer ceramic capacitor according to the present embodiment, the adhesion of the external electrode to the ceramic element at the wraparound part further improves. Moreover, the sealing property at the wraparound part also further improves, and entry of the plating solution, water, and so forth from the joint part between the plating layer 22 and the ceramic element 10 becomes less likely to occur.

In the multilayer ceramic capacitor according to the present embodiment, as illustrated in FIG. 5, the ceramic layer of the protective part 14 of the ceramic element is molten and removed to be dug down by a predetermined depth (indicated by an arrow (↑) in the diagram) by the irradiation of the protective part surface of the ceramic element with the laser. Thus, the multilayer ceramic capacitor has a region in which the height in the stacking direction regarding the upper surface of the protective part exposed in the surface of the ceramic element is lower than that of the boundary line between the underlying electrode layer and the protective part.

Normally, in the multilayer ceramic capacitor, the end part of the underlying electrode layer of the external electrode has a protruding shape as an electrical conductor layer. Thus, an electric field readily concentrates on the end part, and the end part is liable to become the origin of dielectric breakdown. However, according to the present disclosure, due to the possession of the region dug down by the predetermined depth, the dielectric breakdown can be prevented by ensuring the distance between facing external electrodes correspondingly.

Each of the underlying electrode layer, the covering layer, and the plating layer will be described in more detail below.
(Underlying Electrode Layer)

The underlying electrode layer 21 may be a single layer or a multilayer of any of copper (Cu), nickel (Ni), tin (Sn), gold (Au), silver (Ag), palladium (Pd), platinum (Pt), tungsten (W), chromium (Cr), titanium (Ti), or iron (Fe) or an alloy layer of them. A base metal such as Cu or Ni is preferably used in terms of the cost.

It is preferable to employ, as the underlying electrode layer 21, a metal layer deposited by a method such as a sputtering method, chemical vapor deposition (CVD), physical vapor deposition (PVD), atomic layer deposition (ALD), plating, printing, or an ink-jet method.

Among them, in the present embodiment, it is preferable that the underlying electrode layer 21 be a sputtering film formed by the sputtering method, which can form the external electrode that has a small thickness and is even.

In the multilayer ceramic capacitor of the present embodiment, it is preferable that the thickness of the underlying electrode layer 21 be 10 to 1000 nm, and it is more preferable that the thickness be 50 to 400 nm.
(Covering Layer)

The covering layer 30 in the multilayer ceramic capacitor according to the present embodiment is formed of a ceramic layer that has solidified after the ceramic sintered body of the protective part 14 is molten by laser irradiation.

As indicated in working example 1 to be described later, the covering layer 30 includes a crystalline component, and the crystal grain size thereof is larger than that of the protective part 14 located under the underlying electrode layer 21, that is, that of the ceramic sintered body of the protective part 14 that has not received the laser irradiation.

Further, the crystalline component of the covering layer 30 has columnar crystal grains aligned in the thickness direction of the covering layer 30.

Moreover, the crystalline component of the covering layer 30 includes crystal grains with an elliptical shape, and grains about which the ratio between the minor axis length and the major axis length is equal to or higher than 1.5 are included at an area ratio equal to or higher than 10%.

As described above, the crystal of the covering layer 30 and the crystal of the ceramic sintered body of the protective part 14 that has not received irradiation with the laser are different in the grain size thereof and the shape thereof, and it turns out that the covering layer 30 is a molten solidified layer arising from solidification of a ceramic molten due to the irradiation with the laser.

In the crystalline component of the ceramic that has solidified after being molten, the existence frequency of the grain boundary and the area of the grain boundary become small due to increase in the crystal grain size thereof. Thus, it can be said that the covering layer 30 formed of the molten solidified layer has an effect that entry of water and so forth, which are liable to enter, going along the grain boundary, can be prevented.

Further, the crystalline component of the ceramic that has solidified after being molten in the covering layer 30 has the columnar crystal grains aligned in the thickness direction of the covering layer 30. Thus, it can be said that the covering layer 30 has an effect that the strength and the toughness in the direction perpendicular to the crystal alignment direction improve.
(Plating Layer)

In the multilayer ceramic capacitor according to the present embodiment, the plating layer 22 may be a single layer formed of a layer composed mainly of tin (Sn). However, it is preferable to employ multiple layers having a layer composed mainly of tin (Sn) as the uppermost layer.

Specifically, when the underlying electrode layer 21 is a layer composed mainly of copper, it is preferable to employ, as the plating layer 22, a layer composed mainly of copper, a layer composed mainly of nickel, and a layer composed mainly of tin in that order from the side of the underlying electrode layer 21 or employ a layer composed mainly of nickel and a layer composed mainly of tin in that order from the side of the underlying electrode layer 21.

Moreover, when the underlying electrode layer 21 is a layer composed mainly of nickel, it is preferable to employ, as the plating layer 22, a layer composed mainly of copper, a layer composed mainly of nickel, and a layer composed mainly of tin in that order from the side of the underlying electrode layer 21.

FIG. 7 is a partially sectional view that schematically illustrates one example in which the plating layer 22 illustrated in FIG. 4 is formed from multiple layers and is obtained by cutting by a plane parallel to the side surface.

In the example illustrated in FIG. 7, the plating layer 22 is formed from multiple layers, a first plating layer 221, a second plating layer 222, and a third plating layer (uppermost layer) 223.

As illustrated in FIG. 7, the thickness of the plating layer 223 as the uppermost layer can be made even by forming the plating layer 222 in such a manner that the heights of the surface of the covering layer 30 in the height direction and the surface of the plating layer formed become uniform.

In the above, it has been described that an end part of the underlying electrode layer is covered by the covering layer 30 in the external electrode 20 at the wraparound part formed on part of the protective part at the upper surface of the ceramic element. However, it is obvious that an end part of the underlying electrode layer of the external electrode at the wraparound part formed on part of the protective part at the lower surface of the ceramic element or the wraparound part formed on part of the protective parts at both side surfaces of the ceramic element may also be covered by the covering layer 30.

As described above, in the multilayer ceramic capacitor according to the present embodiment, end parts of the underlying electrode layers on one or both of the upper and lower surfaces of the ceramic element are covered by the covering layer 30. This provides operation and effect that the end parts of the underlying electrode layers become less likely to roll up and the plating layers thereon also become less likely to be separated and a high adhesion strength is kept. Further, due to the covering of end parts of the underlying electrode layers on one or both of the upper and lower surfaces of the ceramic element by the covering layer 30, an effect that entry of a plating solution, water, and so forth from the joint part between the underlying electrode layer and the ceramic element becomes less likely to occur is provided.

These operations and effects of the present disclosure are provided in not only the multilayer ceramic capacitor having the pair of (two) external electrodes according to the present embodiment but also the electronic component having a larger number of external electrodes than two on the upper and lower surfaces of the ceramic element.

FIG. 8 is a perspective view schematically illustrating an example of a four-terminal-type multilayer ceramic capacitor that is one example thereof. FIG. 9 is a schematic diagram that exemplifies the multilayer structure of the internal electrodes inside the ceramic element 10 in the multilayer ceramic capacitor illustrated in FIG. 8.

As illustrated in FIG. 9, the ceramic element 10 (see a perspective view on the right) in the four-terminal-type multilayer ceramic capacitor of the present example is composed of a multilayer body obtained by alternately stacking dielectric layers (a) with a substantially square shape in which an internal electrode pattern having internal electrode lead-out parts 111 (a) at both ends of one diagonal is formed and dielectric layers (b) with a substantially square shape in which an internal electrode pattern having internal electrode lead-out parts 111 (b) at both ends of the other diagonal is formed and dielectric layers that are formed on the upper and lower sides of the multilayer body and become the protective parts 14. Furthermore, external electrodes 20 (a) and external electrodes 20 (b) are formed to cover the internal electrode lead-out parts 111 (a) and the internal electrode lead-out parts 111 (b), respectively, led out to four corners of the ceramic element 10.

Moreover, FIG. 10 is a perspective view schematically illustrating an example of a three-terminal-type multilayer ceramic capacitor that is another example. FIG. 11 is a schematic diagram that exemplifies the multilayer structure of the internal electrodes inside the ceramic element 10 in the multilayer ceramic capacitor illustrated in FIG. 10.

As exemplified in FIG. 11, inside the ceramic element 10, dielectric layers (a) in which a first internal electrode pattern is formed and dielectric layers (b) in which a second internal electrode pattern is formed are alternately stacked and dielectric layers that become the protective parts 14 are formed on the upper and lower surfaces of the multilayer body.

The first internal electrode pattern has a rectangular shape, and the long sides of this pattern are longer than the long sides of the second internal electrode pattern to be described later. Further, the second internal electrode pattern has a rectangular shape and has lead-out parts 111 (b) of the internal electrodes at central parts of the two long sides. Thus, the second internal electrode pattern has a substantially cross shape.

The external electrodes 20 (a) and the external electrodes 20 (b) are formed to cover the internal electrode lead-out parts 111 (a) led out to both end surfaces and the lead-out parts 111 (b) of the internal electrodes led out to both side surfaces, respectively, in the ceramic element 10 (see a perspective view on the right).

Although the exemplified multilayer ceramic capacitors are only two examples of the four-terminal type and the three-terminal type, the number of terminals is not limited to these exemplifications and may be any. Moreover, the shapes of the multiple terminals are also not limited to a substantially quadrangular shape and may be any shape.

Further, although the exemplified multilayer ceramic capacitors both have the external electrodes also on the end surfaces and the side surfaces, the multilayer ceramic capacitor that is described in Patent Document 3 and so forth and includes multiple external electrodes only on the upper and lower surfaces of the ceramic element (hereinafter, referred to as a "through-hole-type multilayer ceramic capacitor") is also included in the embodiment of the present disclosure.

In the multilayer ceramic capacitor that has been exemplified above and has a larger number of external electrodes than two on the upper and lower surfaces of the ceramic element (hereinafter, referred to as a "multi-terminal-type multilayer ceramic capacitor") or the through-hole-type multilayer ceramic capacitor, as in the ceramic capacitor of the present embodiment, the external electrodes 20 are composed of the underlying electrode layer and the plating layer formed thereon and have the covering layer that is continuous with the ceramic layer of the protective part 14 near the underlying electrode layer formed on the surface of the protective part 14 at either one or both of the upper and lower surfaces of the ceramic element 10 and covers the rim part of the above-described underlying electrode layer and the plating layer that covers at least the upper surface of the underlying electrode layer (see FIG. 4 and FIG. 6).

Configuring the external electrodes 20 as above provides operation and effect that the rim parts of the underlying electrode layers become less likely to roll up and the plating layers thereon also become less likely to be separated and a high adhesion strength is kept. Moreover, an effect that entry of a plating solution, water, and so forth from the joint part between the underlying electrode layer and the ceramic element becomes less likely to occur is provided.

In the multi-terminal-type multilayer ceramic capacitor or the through-hole-type multilayer ceramic capacitor, the covering layer that covers the rim part of the underlying electrode layer is formed as follows. As in the explanation with FIG. 5, scanning with a laser is executed from a central part of the surface of the ceramic element toward each of multiple underlying electrode layers and the protective part surface is molten and removed by a predetermined depth. Due to this, the covering layer is formed at the boundary part between the ceramic element and the underlying electrode layer through movement of the protective part that has been molten and swollen to the side of the underlying electrode layer and solidification of the protective part.

<Manufacturing Method of Multilayer Ceramic Capacitor>

A manufacturing method of a multilayer ceramic capacitor that is another example of the present embodiment includes (1) a step of forming a multilayer sheet through executing stacking and pressure bonding of ceramic green sheets that do not have an internal electrode pattern after stacking ceramic green sheets on which a predetermined number of internal electrode patterns are printed, (2) a step of cutting the multilayer sheet to form a multilayer chip, (3) a step of firing the multilayer chip to form a ceramic element, (4) a step of forming an underlying electrode layer at least on part of a surface of a protective part on either one or both of the upper and lower sides in the stacking direction in the ceramic element, (5) a step of forming a covering layer by irradiating the vicinity of the underlying electrode layer in the protective part with a laser and melting and removing the surface of the protective part by a predetermined depth to cover an end part or a rim part of the underlying electrode layer by a molten ceramic layer, and (6) a step of forming a plating layer that covers at least the underlying electrode layer.

Further description will be made below about the steps of (4) to (6).

Step of (4):

It is also possible to form the underlying electrode layer 21 by applying and burning electrically-conductive paste that contains an electrically-conductive material, glass powder, and so forth. However, it is preferable to use a method such as a sputtering method, chemical vapor deposition (CVD), physical vapor deposition (PVD), atomic layer deposition (ALD), plating, printing, or an ink-jet method. Among them, in the present embodiment, it is preferable to execute film deposition by the sputtering method which can form the external electrode that has a small thickness and is even.

Step of (5):

As illustrated in FIG. 5, the scanning with the laser is executed from the center of the protective part 14 at which the underlying electrode layer 21 is not formed toward the region in which the underlying electrode layer 21 is formed, and the scanning is executed to stop on the underlying electrode layer side. Due to this, the ceramic layer that has been molten and swollen moves to the underlying electrode layer side and solidifies and the covering layer 30 that covers the end part of the underlying electrode layer can be formed.

The laser used for the irradiation is not particularly limited as long as it is what can melt the ceramic sintered body of the protective part of the ceramic element by heat that accompanies the laser irradiation, and may be either continuous light or pulsed light. As the pulsed laser, the laser may be a short pulsed laser as long as it is not what sublimates the ceramic sintered body without melting it.

Further, in the case of the multilayer ceramic capacitor of a low-height product, particularly when the thickness is equal to or smaller than 100 μm, a beam structure can be formed, and a reinforcement effect can be obtained, by making a region that swells through execution of melting processing by laser scanning, that is, a region in which the position of the upper surface of the ceramic element in the stacking direction is closer to the surface of the external electrode than the position of the boundary line between the underlying electrode layer and the protective part in the stacking direction, at a central part of the surface of the protective part exposed in the surface of the ceramic element.

Step of (6):

Although the plating step may be executed in one time of a treatment step, it is preferable to execute the plating step through (6-1) a step of forming a first plating layer formed of a single layer or multiple layers in such a manner that the heights of the surface of the covering layer 30 in the height direction and the surface of the plating layer formed become uniform, and (6-2) a step of forming a second plating layer on the first plating layer in such a manner as to cover at least part of the covering layer.

By employing the step of (6-1), the thickness of the plating layer as the uppermost layer can be made even.

Specifically, when the underlying electrode layer 21 composed mainly of copper is formed by a sputtering method, it is preferable to execute the step of (6-1) in the order of copper plating and nickel plating or by nickel plating and then execute the step of (6-2) by tin plating.

Moreover, when the underlying electrode layer 21 composed mainly of nickel is formed by a sputtering method, it is preferable to execute the step of (6-1) in the order of copper plating and nickel plating and execute the step of (6-2) by tin plating.

WORKING EXAMPLES

The present disclosure will be described more specifically below according to working examples. However, the present disclosure is not limited to these working examples.

Working Example 1

In the present working example, multilayer ceramic capacitors having external electrodes on both end surfaces were manufactured as follows.

A ceramic element (length (L) was 0.98 mm±0.05 mm and width (W) was 0.48 mm±0.05 mm and height (T) was 0.078 mm±0.12 mm) in which the thickness of dielectric layers (main component $BaTiO_3$) was smaller than 1.0 μm and the thickness of internal electrodes (main component Ni) was smaller than 1 μm and the number of stacked layers was 40 was prepared.

Underlying electrode layers formed of sputtering films (thickness of 0.4 μm) composed mainly of copper (Cu) were formed on both end surfaces and part of the upper and lower surfaces and part of both side surfaces (wraparound part) of the ceramic element. Thereafter, covering layers (average thickness of 3 to 10 μm) that covered tip parts of the Cu underlying electrode layers were formed by executing scanning with a laser from a central part of the ceramic element to the vicinity of each underlying electrode layer under the following condition to melt the ceramic sintered body of the protective part.

(Laser Processing Machine)

Model MD-T1000 (made by KEYENCE CORPORA-
TION)

Laser type Nd: YVO4, wavelength=532 nm

Power: 15%

Rate: 100 mm/see

Frequency: 40 kHz

The number of times of printing: one time

Cu plating layers (thickness of 2 μm) and Ni plating layers (thickness of 2 μm) were formed in this order over the underlying electrode layers of the ceramic element having the covering layers in such a manner that the heights of the surface of the covering layer in the height direction and the surface of the plating layer formed became uniform.

Subsequently, Sn plating layers (thickness of 4 μm) were formed to cover both of the covering layers formed in the ceramic element and the Ni plating layers, so that the multilayer ceramic capacitor was obtained (see FIG. 7).

Comparative Example

Multilayer ceramic capacitors were obtained through forming Cu plating layers, Ni plating layers, and Sn plating layers over the underlying electrode layers, as in working example 1 except that the laser irradiation in working example 1 was not executed.

(Adhesion Strength Evaluation)

Regarding 100 multilayer ceramic capacitors formed in working example 1 and the comparative example, a scotch tape was stuck to the external electrode composed of the underlying electrode layer and the plating layers (Cu/Ni/Sn) and the number of samples from which the external electrode was torn off by the scotch tape was evaluated.

The result is indicated in the following table 1.

TABLE 1

|  | Laser | Separation result | Evaluation |
|---|---|---|---|
| Working example 1 | Irradiated | 0/100 | ○ |
| Comparative example | Not irradiated | 3/100 | — |

(Wet Heat Test Evaluation)

With use of the multilayer ceramic capacitors obtained in the above-described working example 1 and comparative example, resistivity change in 24 hours under a condition of temperature: 85° ° C., humidity: 85%, and voltage: rated 4 V×2=8 V was measured and the sample in which the resistivity changed by 1000Ω or higher was regarded as an unacceptable sample.

The numbers of unacceptable samples in the number of test samples, 100, were described in the following table 2.

TABLE 2

|  | Laser | The number of unacceptable samples | Evaluation |
|---|---|---|---|
| Working example 1 | Irradiated | 0/100 | ○ |
| Comparative example | Not irradiated | 20/100 | — |

(Observation and Elemental Analysis of Crystal Grains)

In the multilayer ceramic capacitor obtained in working example 1, in order to compare the covering layer formed by the laser irradiation and the protective part 14 that had not received the laser irradiation, observation of the crystal shape and measurement of the crystal grain size by use of a scanning electron microscope electron back scattered diffraction measuring device (SEM-EBSD) and elemental analysis by use of SEM-EDS (energy-dispersive X-ray spectroscopy) were executed regarding the covering layer and the protective part located under the underlying electrode layer.

Regarding the crystal grain size, circular approximation of the area value of each crystal grain was executed, and the diameter thereof was regarded as the crystal grain diameter.

FIG. 12 is a diagram illustrating the crystal shape of a place that has solidified after being molten, and an EBSD image of a place surrounded by a rectangle in a left schematic diagram is extracted, and a schematic diagram thereof is illustrated in a right diagram.

As a result, the following facts were found.

(1) The covering layer was a crystalline component and the crystal grain size thereof was larger than that of the ceramic sintered body in the protective part, and the crystal grain size of the former was 0.05 to 9 µm whereas the crystal grain size of the latter was 0.01 to 0.8 µm.

(2) The crystalline component in the covering layer had columnar crystal grains aligned in the thickness direction of the covering layer.

(3) The crystalline component in the covering layer 30 included crystal grains with an elliptical shape and grains about which the ratio between the minor axis length and the major axis length was equal to or higher than 1.5 were included at an area ratio equal to or higher than 10%.

(4) The composition of the covering layer was not different from the composition of the protective part that had not received the laser irradiation.

Working Example 2

In the present working example, the four-terminal-type multilayer ceramic capacitors illustrated in FIGS. 8 and 9 were manufactured as follows.

The ceramic element illustrated in FIG. 9 (thickness of dielectric layers (main component BaTiO$_3$): smaller than 0.7 µm, thickness of internal electrodes (main component Ni): smaller than 1 µm, the number of stacked layers: 40, length (L): 0.58 mm±0.05 mm, width (W): 0.48 mm±0.05 mm, height (T): 0.05 mm±0.01 mm) was prepared.

Underlying electrode layers formed of sputtering films (thickness of 0.4 µm) composed mainly of copper (Cu) were formed on side surface parts to which the internal electrodes were lead out and four corners of the upper and lower surfaces that sandwich the side surface parts in the ceramic element.

Subsequently, covering layers (average thickness of 3 to 10 µm) that covered end parts of the Cu underlying electrode layers were formed by executing scanning with a laser from central parts of the upper and lower surfaces of the ceramic element to the vicinity of each underlying electrode layer under the following condition to melt the ceramic sintered body of the protective part.

(Laser Processing Machine)

Model MD-T1000 (made by KEYENCE CORPORATION)

Laser type Nd: YV04, wavelength=532 nm

Power: 15%

Rate: 100 mm/see

Frequency: 40 KHz

The number of times of printing: one time

FIG. 13 is a diagram schematically illustrating the above-described laser scanning method.

As illustrated by a line given arrows in this diagram, scanning with the laser was executed in a cross manner from a central part of the ceramic element toward the outside of the ceramic element, and the scanning was executed to stop on the rim side of each underlying electrode layer.

Thereafter, Cu plating layers (thickness of 2 µm) and Ni plating layers (thickness of 2 µm) were formed in this order over the underlying electrode layers of the ceramic element having the above-described covering layers in such a manner that the heights of the surface of the covering layer in the height direction and the surface of the plating layer formed became uniform.

Subsequently, Sn plating layers (thickness of 4 µm) were formed to cover both of the covering layers formed in the ceramic element and the above-described Ni plating layers.

Adhesion strength evaluation, wet heat test evaluation, and observation of crystal grains were executed, as in working example 1, with use of the obtained four-terminal-type multilayer ceramic capacitors. As a result, results similar to those of working example 1 were obtained.

Working Example 3

In the present working example, a four-terminal-type multilayer ceramic capacitor was obtained, as in working example 2 except that a beam structure was formed through making a region that had swollen through execution of melting processing by laser scanning at a central part of a ceramic element (a width in the W direction was 600 μm, a width in the L direction was 500 μm, a height (T) was 60 μm).

Figure 14:
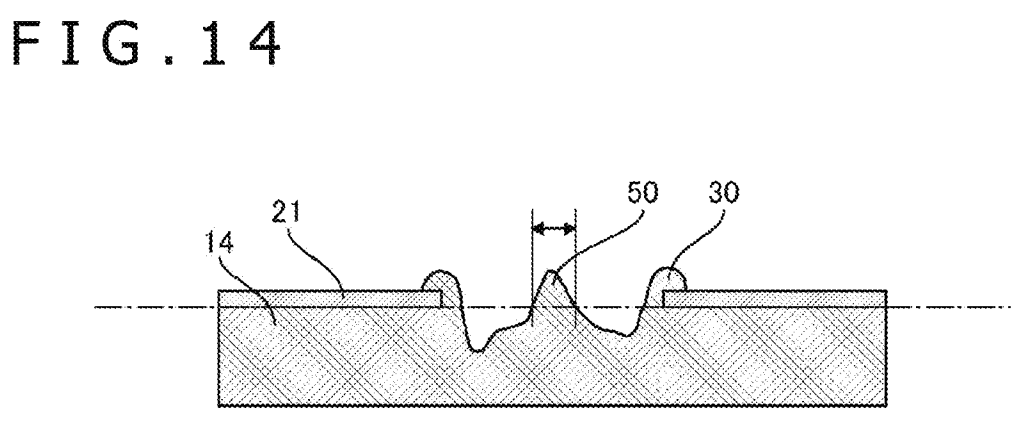

FIG. 14 is a sectional view schematically illustrating a swollen region at a central part of the protective part surface, formed by melting processing based on a laser.

The width of a beam 50 formed was 20 to 40 nm as the width on the boundary line between the protective part 14 and the underlying electrode layer 21.

INDUSTRIAL APPLICABILITY

According to the present disclosure, the adhesion of the external electrodes improves. Therefore, a separation trouble of the external electrode can be reduced even when the thin external electrode is formed by a sputtering method or other methods. Further, such an effect of the present disclosure is more effective when the thickness of the ceramic element becomes smaller. Thus, the present disclosure can be used for a multilayer ceramic capacitor with a low height in which the thickness of the ceramic element is equal to or smaller than 150 μm.

It should be understood by those skilled in the art that various modifications, combinations, sub-combinations and alterations may occur depending on design requirements and other factors insofar as they are within the scope of the appended claims or the equivalent thereof.

What is claimed is:

1. A multilayer ceramic electronic component comprising:
a ceramic element having
a multilayer body in which a plurality of internal electrodes are stacked with interposition of a dielectric layer and the internal electrodes are led out in a direction orthogonal to a stacking direction, and
a protective part that is located at least on upper and lower surfaces of the multilayer body in the stacking direction and is formed of a ceramic layer;
an underlying electrode layer formed at least on part of a surface of the protective part on either one or both of upper and lower sides in the stacking direction;
a covering layer that is continuous with the ceramic layer of the protective part near the underlying electrode layer and covers an end part or a rim part of the underlying electrode layer;
a plating layer that covers at least an upper surface of the underlying electrode layer; and
at least a pair of external electrodes that have the underlying electrode layer and the plating layer and are electrically connected to the internal electrodes,
wherein, at least in a boundary region with the covering layer in the protective part on which the external electrode is not formed, a position of the surface of the protective part on which the external electrode is not formed in the stacking direction is located on a side of the multilayer body relative to a position of a boundary line between the underlying electrode layer and the protective part in the stacking direction.

2. The multilayer ceramic electronic component according to claim 1,
wherein the covering layer includes a crystalline component, and crystal grain size of the crystalline component is larger than crystal grain size of a ceramic sintered body in the protective parts.

3. The multilayer ceramic electronic component according to claim 1,
wherein the covering layer includes a crystalline component and has columnar crystal grains aligned in a thickness direction of the covering layer.

4. The multilayer ceramic electronic component according to claim 1,
wherein the covering layer includes crystal grains with an elliptical shape and includes crystal grains about which a ratio between a minor axis length and a major axis length is equal to or higher than 1.5 at an area ratio equal to or higher than 10%.

5. The multilayer ceramic electronic component according to claim 1,
wherein the covering layer is formed of a molten solidified layer of a ceramic.

6. The multilayer ceramic electronic component according to claim 1,
wherein the plating layer further covers at least part of a surface of the covering layer.

7. The multilayer ceramic electronic component according to claim 1,
wherein the underlying electrode layer is formed of a single layer or a multilayer of any of copper, nickel, tin, gold, silver, palladium, platinum, tungsten, chromium, titanium, or iron or an alloy layer of them.

8. The multilayer ceramic electronic component according to claim 1,
wherein the underlying electrode layer is a metal film formed of a sputtering film, a chemical vapor deposition film, a physical vapor deposition film, an atomic layer deposition film, a plating film, a printing film, or an ink-jet printing film.

9. The multilayer ceramic electronic component according to claim 1,
wherein the plating layer is formed of a layer composed mainly of tin or is formed of a plurality of layers having a layer composed mainly of tin as an uppermost layer.

10. The multilayer ceramic electronic component according to claim 9,
wherein the plating layer has a layer composed mainly of copper, a layer composed mainly of nickel, and a layer composed mainly of tin sequentially from a side of the underlying electrode layer or has a layer composed mainly of nickel and a layer composed mainly of tin sequentially from the side of the underlying electrode layer.

11. The multilayer ceramic electronic component according to claim 1,
wherein the multilayer ceramic electronic component has a thickness equal to or smaller than 100 μm and has, at a central part of the surface of the protective part exposed in a surface of the ceramic element, a region in which a position of the surface of the protective part in the stacking direction is closer to a surface of the external electrode than the position of the boundary line between the underlying electrode layer and the protective part in the stacking direction.

\* \* \* \* \*